United States Patent [19]

Martinet et al.

[11] Patent Number: 4,848,499

[45] Date of Patent: Jul. 18, 1989

[54] SERVO-CONTROL DEVICE FOR STEERING AN ARTICULATED VEHICLE

[76] Inventors: Simon Martinet, Fleurettes 11; Christian Kunze, Chemin du Suchet 3, both of 1373 Chavornay, Switzerland

[21] Appl. No.: 62,462
[22] PCT Filed: Sep. 29, 1986
[86] PCT No.: PCT/CH86/00136
 § 371 Date: May 28, 1987
 § 102(e) Date: May 28, 1987
[87] PCT Pub. No.: WO87/01999
 PCT Pub. Date: Apr. 9, 1987

[30] Foreign Application Priority Data

Sep. 30, 1985 [FR] France .................................. 85 14573

[51] Int. Cl.⁴ .............................................. B62D 13/02
[52] U.S. Cl. ................................ 180/79.1; 280/419; 340/438; 340/937
[58] Field of Search ..................... 180/135, 79.1, 14.1, 180/131; 280/419, 422, 426, 442, 446 B, 448, DIG. 14; 318/581, 587; 340/74, 79, 935, 937; 364/424, 424.1, 425

[56] References Cited

U.S. PATENT DOCUMENTS

| | | | |
|---|---|---|---|
| 3,219,975 | 11/1965 | Finvold | 318/581 X |
| 3,668,499 | 6/1972 | Malloy | 180/79.1 |
| 3,864,578 | 2/1975 | Lackey | 340/74 X |
| 3,944,972 | 3/1976 | Chandler | 340/74 |
| 4,005,313 | 1/1977 | Tibbits | 280/422 X |
| 4,111,452 | 9/1978 | Carlsson | 280/422 X |
| 4,477,874 | 10/1984 | Ikuta et al. | 364/424 |
| 4,585,248 | 4/1986 | Miller et al. | 280/446 B |
| 4,688,818 | 8/1987 | Grassmuck | 180/135 |

FOREIGN PATENT DOCUMENTS

| | | | |
|---|---|---|---|
| 2339600 | 2/1975 | Fed. Rep. of Germany | 280/419 |
| 1049322 | 10/1983 | U.S.S.R. | 280/419 |

OTHER PUBLICATIONS

Martinet, WO 85/03263, PCT, 8/85.

Primary Examiner—John A. Pekar
Attorney, Agent, or Firm—Frost & Jacobs

[57] ABSTRACT

A servo-control device for steering an articulated vehicle comprising four analog detectors (30, 31, 32, 33, 34) respectively connected to control amplifiers (30', 31', 32', 33') whose outputs are connected to the inputs (30", 31", 32", 33") of a multiplexer (40). The latter is connected to the input of a converter (41) which converts the analog signals of the detectors into digital signals transmitted to a digital calculator (42) powered by an energy source (43). The output of the calculator (42) is connected to a converter (44) whose output signal amplified by the amplifier (45) is directed to a servo-control device.

5 Claims, 3 Drawing Sheets

SERVO-CONTROL DEVICE FOR STEERING AN ARTICULATED VEHICLE

BACKGROUND OF THE INVENTION

The present invention relates to a servo-control device for steering an articulated vehicle including a tractor and at least one trailer with wheels with fixed or articulated axles, and control means to give this device a steering set-point, this device including a first detector for detecting the position of the guiding wheels of the tractor vehicle, at least a second detector for detecting the position of the trailer relative to the axis of the tractor vehicle and an electronic circuit for providing the servo-control device with a control signal for steering the front wheels of the tractor as a function of information provided by the first and the second detectors and the steering set-point given by the control means.

A device of this type which is already known is described in the international patent application published under number WO 85/03263.

In this patent application, there are essentially described the different servo-controls acting on the steering control to principally facilitate maneuvers in reverse motion of articulated vehicles of the half-trailer type or of the truck type towing a trailer.

It is proposed in the present invention to define a number of improvements of this device to ensure its sure and efficient operation under all circumstances. One of the objectives sought when maneuvering this type of vehicle is precise positioning of the trailer with respect to a fixed obstacle such as for example the corner of a road, the door of a shed, or the edge of a loading ramp.

SUMMARY OF THE INVENTION

As opposed to what has been done by the known systems, where the objective set was precise positioning of the road train, incluidng both the trailer and the tractor, over a path considered as ideal, the invention provides for a system which enables the trailer to be positioned, over a maneuvering distance which is as short as possible, whatever the final position of the tractor may be, while however respecting the boundary conditions, that is, by interdicting the angular positions especially of the drawbar, which could cause defects either of the drawbar or of the body of the tractor or the trailer.

To this end, the device according to the invention is characterized in that the electronic circuit includes a digital calculator for processing the information delivered by the detectors.

In the case where the detectors are analog sensors, the electronic circuit advantageously includes a multiplexer each of whose inputs is connected to a detector and an analog to digital converter coupled between the multiplexer and the digital calculator.

In the case where the detectors are digital sensors, the electronic circuit advantageously includes a multiplexer each of whose inputs is connected to a detector and whose output is directly coupled with the digital calculator.

According to an advantageous embodiment, the device includes alarm means mounted in the driver's cab, said means being linked to the detectors to indicate to the driver that the vehicle reaches its limiting angles of lock.

To control the guiding wheels of the tractor vehicle, the device may also include motor means with a high starting torque.

To facilitate maneuvers, the device may include means for visualizing the trailer and/or the tractor vehicle, mounted on the dashboard of the tractor vehicle.

According to another embodiment, the device may include two series of signal lights mounted repectively on the right edge or on the left edge of at least one rearvision mirror of the tractor vehicle, these signal lights being adapted to provide the driver with an indication of the direction in which he has to turn the steering wheel of the tractor vehicle to correctly execute the maneuver, as well as the amplitude of the rotation of said steering wheel.

For reasons of safety, the device may include mechanical safety stops associated with contactors adapted to provide the calculator with information relating to the maximum angles of lock.

It may also include electronic means adapted to provide the calculator with information relating to the maximum angles of lock.

According to a particularly advantageous embodiment, the device includes a control unit adapted to act upon the transmission and the brakes of the vehicle and mounted in a steering post disposed at the rear of this vehicle.

To enable maneuvers to be controlled from the exterior, it preferably includes portable remote control equipment.

According to another preferred embodiment, the trailer and/or the tractor vehicle is equipped with means for coding the dimensional characteristics of the trailer, said means being adapted to transmit to the digital calculator programming information corresponding to these dimensional characteristics.

Said means preferably comprise a male connector and a female connector respectively mounted on the trailer and the tractor vehicle, the connector of the trailer being coded, and the connector of the tractor vehicle being adapted to transmit said programming information to the calculator. They may include a card coded according to the dimensional characteristics of the trailer and a coded card reader for transmitting said programming information to the calculator.

The device advantageously includes retractable mechanical means comprising an electric motor and at least one transmission rod linked to a flexible shaft carrying a coupling sleeve adapted to cooperate with a female connecting piece solid with the steering wheel to drive this wheel during maneuvering operations controlled by the control member intended for giving a steering set-point.

BRIEF DESCRIPTION OF THE DRAWINGS

The present invention will be better understood with reference to the description of exemplary embodiments and to the accompanying drawings wherein.

DETAILED DESCRIPTION OF THE INVENTION

Figure 1:
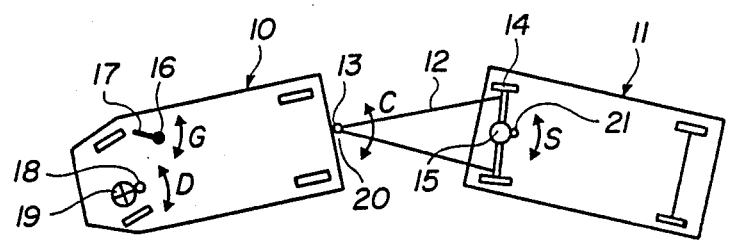
FIG. 1 represents a schematic view of an articulated vehicle of the truck-trailer type.

With reference to FIG. 1, the device of the invention is mounted on an articulated vehicle of the type with a truck 10 for traction of a trailer 11. The trailer 11 is coupled with the truck 10 by a drawbar 12 carrying a tow-hook 13. The trailer further includes a front axle 14 articulated on a trailer dolly 15. To provide to an electronic circuit the information to enable it to control the servo-control device, the truck includes a first detector 16 associated with the control member 17 called hereinafter the scull, adapted to deliver to the circuit a steering set-point.

A second detector 18 is associated with the steering wheel 19. The detector 16 provides an angle measurement designated G. The detector 16 provides an angle measurement designated D. The tow-hook 13 carries a detector 20 which provides an angle measurement designated C. The dolly 15 is associated with a detector 21 which provides an angle measurement designated S. The angles are measured in absolute value. Each detector includes a zero point which corresponds to a real value of the corresponding angle. These detectors may consist of analog sensors of the potentiometric, capacitive, inductive, magnetic type, etc. or digital sensors of the chopper disk type known per se. They are designed to provide an absolute angle measurement which constitutes the basic information intended for processing by the electronic circuit.

The operating algorithm is determined in such manner that at each instant one tends to annul the errors on the the angles C and S, that is, the angles of the hook and of the dolly with respect to an ideal path. This ideal path may be defined as the path the same vehicle would follow if circulating in forward motion. This path is either linear, when the angle D is nil, or circular when this angle has a value other than zero.

The regulating equation is the following:

$$K_1(G-S)+K_2(G-C)-G=D$$

if $$K_3=K_1+K_2-1$$

one obtains $$D=K_3G+K_2C-K_1S$$

The coefficients $K_1$, $K_2$ and $K_3$ are called the gains. In practice, one arranges to make these gains vary according to control laws, so that in course of operation the steering never exceeds the maximum angle of lock limit. By operating in closed loop servo-control, the values of the angles are permanently controlled and the gains are adjusted so that these values never reach saturation. The above mentioned regulating equation is validly applied to small variations of the angle G which defines the steering set-point. For relatively large jumps of the angle G, the angle C would risk reaching critical values. To avoid this risk, the gains are made to vary in an appropriate fashion. The law of selection of the gains is such that the displacement of the vehicle close to the ideal path is effected in minimum time. In practice, this time is least when the effective path followed by the vehicle is closest to the ideal path. The greater the fluctuations on either side of this path, the longer the time the vehicle will take to reach its objective.

The formula below illustrates a particular case of selection of gains $K_4$ and $K_5$ and defines the law which applies when the angle of the hook C approaches its limiting value.

$$D=K_4(C-C\text{max})+K_5G$$

In this case $K_1=0$, which comes to limiting the movement of the dolly when the angle of the hook approaches its maximum value.

Figure 2:
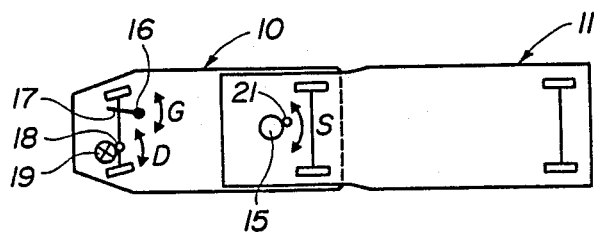
FIG. 2 schematically represents a vehicle of the half-trailer type.

FIG. 2 illustrates a half-trailer vehicle including, as previously, a tractor 10 to which a trailer 11 is coupled. As previously, the tractor is equipped with a scull 17 associated with a detector 16 defining the steering set-point angle G and a steering wheel 19 associated with a detector 18 defining the angle D of the guiding wheels of the tractor 10. A dolly 15 associated with a detector 21 defines the angle S of the dolly. In this case the angle C is nil on account of the absence of a tow-bar and the corresponding hook. Consequently the equation defining the angular value D of the steering wheel is thereby simplified.

The system could be generalized in the form of an application to vehicles including for example a tractor and two trailers or a half-trailer to which a supplementary trailer is coupled. In this case, at least one complementary parameter defined by the angle of the articulated element of the supplementary trailer has to be introduced.

The absolute measurement of the angles with respect to the road is necessary to avoid a total drift of the vehicle during reverse motion in a straight line. In certain known systems, the device tended in fact to align the tractor on the trailer axis. Due to this, if the trailer initially had a transverse position with respect to the road, and if the driver gave his vehicle, via the set-point, the order to back up in a straight line, the whole road train was brought to a transverse position. To avoid this drawback, the driver may either make the vehicle advance in a straight line so as to bring the axis of the trailer into the desired direction, or else he may make the tractor deviate in reverse motion so as to cause the trailer to also deviate. The electronic device is designed to measure this drift, its duration and to compensate it in the other direction so that the mean path of the vehicle will be rectilinear.

Figure 3:
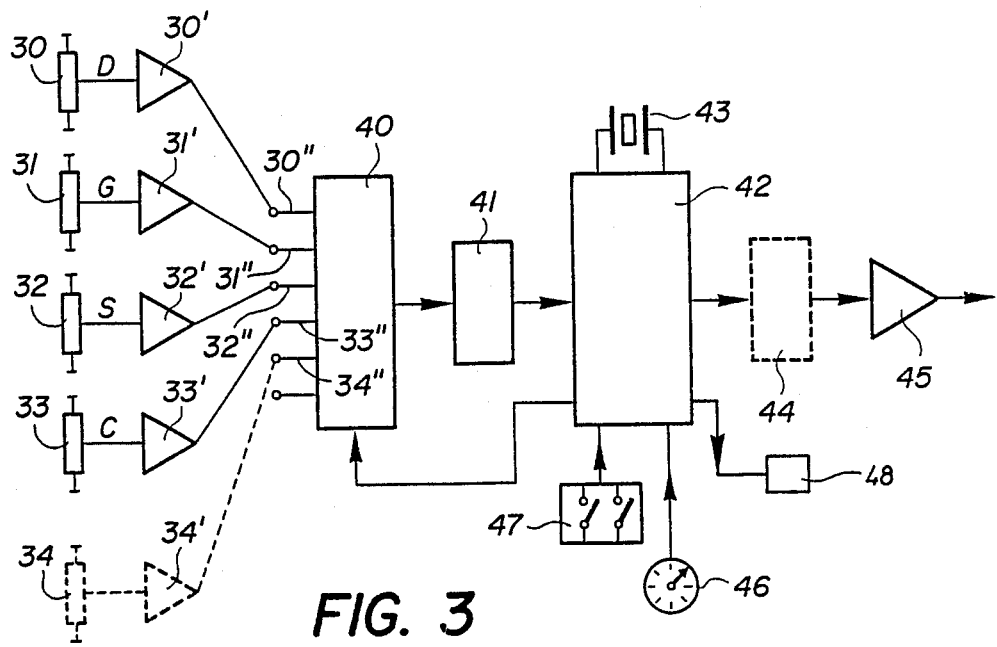
FIG. 3 represents a block diagram illustrating an embodiment of the electronic circuit of the device according to the invention.

FIG. 3 is a block diagram illustrating an embodiment of the electronic circuit of the device described above. A first analog detector 30 linked to the steering of the tractor provides an information corresponding to the angle D to a control amplifier 30' whose output is linked to an input 30" of a multiplexer 40.

A second analog detector 31 provides information corresponding to the angle G of the scull to a control amplifier 31' whose output is connected to an input 31" of the multiplexer 40. A third analog detector 32 transmits a signal corresponding to the angle of the dolly S to a control amplifier 32' whose output is connected to an input 32" of the multiplexer 40 and a fourth analog detector 33 transmits a signal corresponding to the angle C of the hook to a control amplifier 33' whose output is connected to an input 33" of the multiplexer 40.

This electronic circuit corresponds to the case of the truck for traction of a trailer represented in FIG. 1. In the case of an extension to a truck for traction of two trailers, a fifth detector 34 represented in broken lines may be provided. In this case, a fifth control amplifier 34' is associated with this detector and its output is connected to a complementary input 34" of the multiplexer 40. In the case of the half-trailer vehicle illustrated in FIG. 2, the detector 33 corresponding to the hook is omitted.

The output of the multiplexer 40 is connected to the input of an analog to digital converter 41 which enables converting the signals of the analog detectors into digital signals transmitted to a digital 42 powered by an energy source 43. The output of the calculator 42 may be connected to a digital to analog converter 44 (represented in broken lines) whose output signal previously amplified by an amplifier 45 is directed to a servo-control device which may be an electro-hydraulic system or an electric motor. The control, instead of being proportional, may be carried out directly. In that case, the converter 44 may be omitted. A selector 46 is connected to the calculator 42 to provide the latter with information on the type of vehicle, the wheel base, etc.

Figure 4:
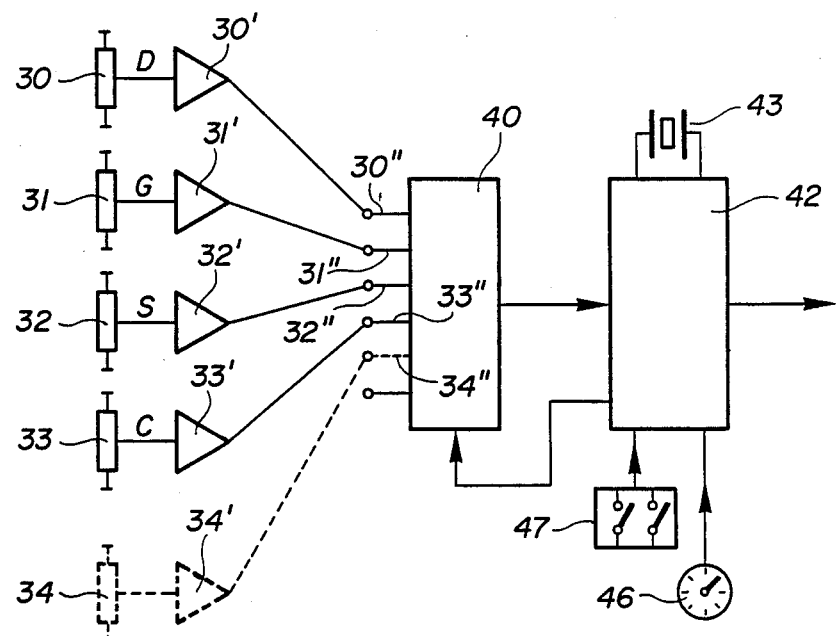
FIG. 4 represents a block diagram illustrating another embodiment of the electronic circuit of the device according to the invention.

The selector 46 represented in FIGS. 3 and 4 is preferably placed within the tractor vehicle. It may consist of a stop contactor with several positions each corresponding to a particular trailer. This selector may also be replaced by a keyboard in which the driver enters the trailer type.

Another technique consists in providing a magnetic card for each trailer type and inserting in an appropriate reader the coding card whose data are transmitted to the calculator.

Contactors 47 linked to mechanical stops are designed to provide the calculator 42 with information concerning maximum angles of lock. The mechanical stops may be replaced by any system serving the same purpose, for example an electronic device.

A warning device 48 is associated with the digital calculator to inform the driver if necessary that the maximum angles of lock are reached or that the effective values of these angles are approaching limiting values considered to be dangerous.

The selector 46 is useful for programming the calculator as a function of the characteristics of the trailer, namely its length, its wheel base, data relating to the drawbar, the maximum angle of lock, etc. It is quite evident that such programming necessitates intervention by the driver, and possibly preliminary training to enable him to effect such programming without error.

To avoid such an intervention, one may also provide means for automatic programming effected by means of an appropriate coding of the trailer and by a system for electrical connection of the trailer to the truck.

Figure 6:
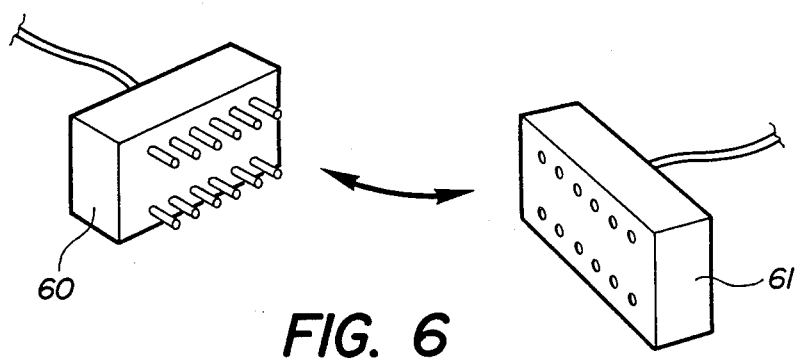
FIG. 6 represents the trailer coding connectors.

Two different methods may be utilized to this end. A first method provides for coding the trailer by means of two parameters which are: A, the length of the drawbar, that is, the distance between the hook and the axle and B, its wheel base. The value of those two sizes are defined by codes, for example binary codes. By way of example as shown by FIG. 6, each code is with six positions, which allows coding sixty-four different trailers. The tractor vehicle is equipped for example with a male connector 60 and the trailer is equipped with a female connector 61. In binary coding, certain contacts of the female connector of the trailer are connected to earth while certain other contacts are connected to a voltage source. Coupling the two connectors ensures identification of the trailer.

According to a second method, the value numbered in chosen length units, for example in centimeters, is directly coded by means of the two male and female connectors. In that case, the number of contacts coupled by means of the two connectors directly defines the lengths A and B. The length written in binary language is directly conducted to the calculator which derives therefrom the control parameters.

It is quite evident that any other binary code such as "Gray", etc. could be utilized for coding the trailers.

The electronic circuit represented in FIG. 4 differs from that in FIG. 3 by the absence of the analog to digital converter 41 and that of the digital to analog converter 44. This is due to the fact that, in this case, the detectors 30, 31, 32, 33 and 34 consist of digital detectors. The hydraulic servo-control device is designed to respond to digital information.

To ensure maximum reliability of operation of the system, the driver's cab may be equipped with warning devices in the form of signal lights, sound signals or a combination of these two means which emit signals when the vehicle approaches or reaches the limiting angles of lock which, when reached, cause bending or breaking of the mechanical coupling elements.

Another interesting accessory may be provided to make it easier for the driver to control the maneuvers executed. It is a device provided on the dashboard for visualizing the trailer and/or the tractor vehicle. Such a device may be particularly useful when the trailer is narrower than the tractor so that locating it from the steering post is particularly difficult. This applies especially to the case of trailers carrying fire engine pumps, etc.

To provide the driver with complete information and images of the surroundings in which the maneuver is carried out, the vehicle may be equipped with a video camera, mounted at the rear of the road train, and with a control receiver disposed within the cab of the tractor vehicle. Such a device may be particularly useful for carrying out maneuvers in reverse motion in small locations.

As previously mentioned, the booster may be of the hydraulic, mechanical or electrical type. In the latter case, one should dispose of an electromechanical device having a considerable starting torque.

Figure 5:
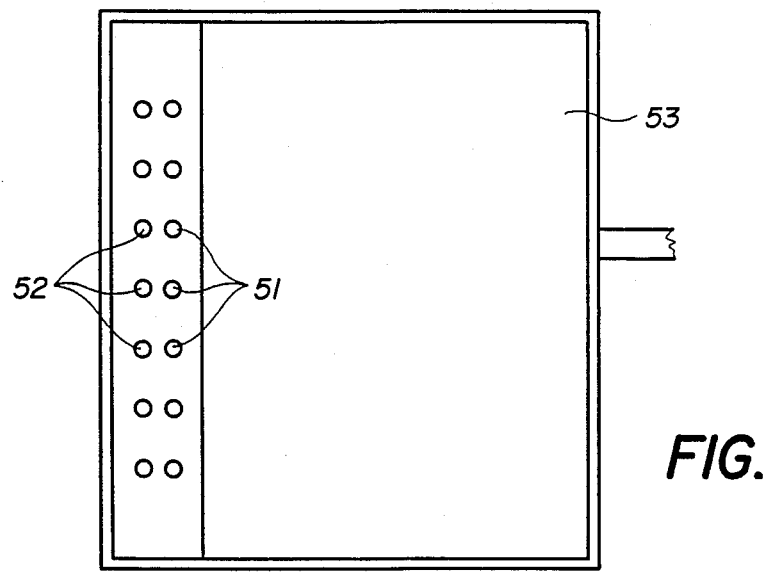
FIG. 5 represents an embodiment of a rearvision mirror with signal lights mounted outside the driver cab.

Another device, illustrated in FIG. 5, may be particularly useful to assist the driver in the course of maneuvers. It consists of steering indicating lamps or signal lights preferably mounted close to or on at least one rearvision mirror of the tractor vehicle. Two series of signal lights 51 and 52 of different colours with progressive lighting or variable luminous intensity may be mounted either along the right edge or along the left edge of a rearvision mirror 53 to indicate to the driver in which direction he has to turn the steering wheel of the vehicle and the amplitude of the rotation of this steering wheel for the maneouver to be correctly executed. It is well undersood that the signal lights have to be disposed in the immediate proximity of the rearvision mirror or mirrors in order that the driver may simultaneously see the image transmitted by the mirror and said signal lights. By way of an example, the signal lights 51 may be green and indicate to the driver that he has to turn the steering wheel to the right.

The signal lights 52 may be red and indicate to the driver that he has to turn the steering wheel in the other direction. This enables a semi-automatic device to be made wherein the automatic control of the booster may omitted. Although less precise and less effective, such a device could be of economic interest in view of its reduced cost.

Figure 7:
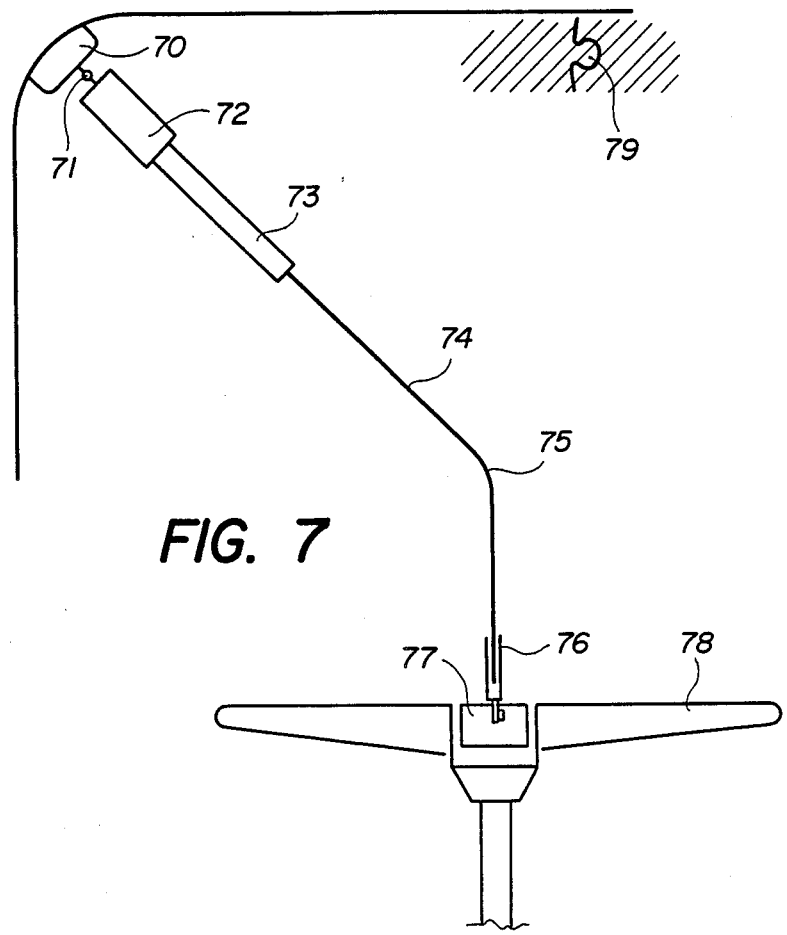
FIG. 7 schematically represents means for driving the steering wheel of the tractor vehicle.

FIG. 7 illustrates mechanical means for controlling the steering wheel of the tractor vehicle during maneuvers in reverse motion. Control of the maneuver is effected by means of a control member 16 represented in FIGS. 1 and 2, and the transmission to the steering wheel of the vehicle is effected by means of an appropriate transmission coupled with the center of the steering wheel. This transmission is composed of a support 70 fixed for example in an upper corner of the cab or the tractor or the truck, an articulation 71 which couples this support with a motor or a geared motor 72 whose output shaft 73 is coupled with a rectilinear rod 74 connected by a flexible shaft to a coupling sleeve 75 adapted for engagement in a female connecting piece 76 solid with the hub of the steering wheel 77. A clip 78 allows this transmission to be fixed to the roof of the cab when the system is at rest, that is, when the vehicle is in normal road travel.

The present invention is not limited to the described embodiments but may undergo various modifications and present different variants obvious to a person skilled in the art. In particular, the electronic circuit could include analog detectors and a numerical output acting directly upon an electromechanical booster device known per se.

Further, the road train may include a rear steering post, including a control unit linked to the device and acting upon the transmission and the brakes of the vehicle, so as to enable the conductor to direct a maneuver in reverse motion from the rear of the vehicle.

This variant may be linked with portable remote control equipment which enables the maneuvers to be directed entirely from outside the vehicle.

These two variants enable the driver to directly visualize the terrain of the maneuver and the displacement of the vehicle, without his attention being distracted by the control of this maneuver.

We claim:

1. A servo-control device for steering an articulated vehicle including a tractor vehicle having guiding wheels, at least one trailer with wheels having one of fixed and articulated axles, and control means to provide said device with a steering set-point, said servo-control device including a first detector for detecting the position of the guiding wheels of the tractor vehicle, at least a second detector for detecting the position of the trailer relative to the axis of the tractor vehicle, an electronic circuit for providing said servo-control device with a control signal for steering the guiding wheels of the tractor as a function of information provided by said first and second detectors and the steering set-point provided by said control means, said electronic circuit including a digital calculator for processing the information provided by said detectors, a camera fixed at the rear of the articulated trailer, and a control receiver situated in a cab of said tractor vehicle.

2. A servo-control device for steering an articulated vehicle including a tractor vehicle having guiding wheels, at least one trailer with wheels having one of fixed and articulated axles, and control means to provide said device with a steering set-point, said servo-control device including a first detector for detecting the position of the guiding wheels of the tractor vehicle, at least a second detector for detecting the position of the trailer relative to the axis of the tractor vehicle, an electronic circuit for providing said servo-control device with a control signal for steering the guiding wheels of the tractor as a function of information provided by said first and second detectors and the steering set-point provided by said control means, said electronic circuit including a digital calculator for processing the information provided by said detectors, and wherein at least one of said trailer and said tractor vehicle is equipped with means for coding the dimensional characteristics of the trailer, said means for coding being adapted to transmit to said digital calculator programming information corresponding to these dimensional characteristics.

3. The device according to claim 2, wherein said coding means comprise a male connector and a female connector respectively mounted on said trailer and said tractor vehicle, the connector of said trailer being coded, and the connector of said tractor vehicle being adapted to transmit said programming information to said digital calculator.

4. The device according to claim 2, wherein said coding means include a card coded according to the dimensional characteristics of said trailer and a coded card reader for transmitting said programming information to said digital calculator.

5. A servo-control device for steering an articulated vehicle including a tractor vehicle having guiding wheels, at least one trailer with wheels having one of fixed and articulated axles, and control means to provide said device with a steering set-point, said servo-control device including a first detector for detecting the position of the guiding wheels of the tractor vehicle, at least a second detector for detecting the position of the trailer vehicle, an electronic circuit for providing said servo-control device with a control signal for steering the guiding wheels of the tractor as a function of information provided by said first and second detectors and the steering set-point provided by said control means, said electronic circuit including a digital calculator for processing the information provided by said detectors, and including removable mechanical means comprising an electric motor and at least one transmission rod linked to a flexible shaft carrying a coupling sleeve adapted to cooperate with a connecting piece solid with a steering wheel to drive said steering wheel during maneuvering operations controlled by said control means for providing a steering set-point.

* * * * *